(12) United States Patent
Payne

(10) Patent No.: US 9,528,385 B2
(45) Date of Patent: Dec. 27, 2016

(54) MONITORING AND CONTROL SYSTEM

(71) Applicant: ROLLS-ROYCE PLC, London (GB)

(72) Inventor: Russell Geoffrey Payne, Nr Faringdon (GB)

(73) Assignee: ROLLS-ROYCE plc, London (GB)

(*) Notice: Subject to any disclaimer, the term of this patent is extended or adjusted under 35 U.S.C. 154(b) by 570 days.

(21) Appl. No.: 14/079,885

(22) Filed: Nov. 14, 2013

(65) Prior Publication Data

US 2014/0147245 A1    May 29, 2014

(30) Foreign Application Priority Data

Nov. 23, 2012    (GB) .................................. 1221095.1

(51) Int. Cl.

| | |
|---|---|
| *F01D 17/14* | (2006.01) |
| *F04D 29/56* | (2006.01) |
| *F01D 17/16* | (2006.01) |
| *F04D 27/02* | (2006.01) |
| *F02C 9/20* | (2006.01) |
| *B64C 11/30* | (2006.01) |
| *B64C 27/54* | (2006.01) |

(52) U.S. Cl.
CPC ............... *F01D 17/14* (2013.01); *B64C 11/30* (2013.01); *B64C 27/54* (2013.01); *F01D 17/162* (2013.01); *F02C 9/20* (2013.01); *F04D 27/0246* (2013.01); *F04D 29/563* (2013.01); *Y02T 50/671* (2013.01)

(58) Field of Classification Search
CPC ...... F01D 17/14; F01D 17/162; F04D 29/563; F04D 27/0246; F02C 9/20; B64C 11/30; B64C 27/54; Y02T 50/671
See application file for complete search history.

(56) References Cited

U.S. PATENT DOCUMENTS

| | | |
|---|---|---|
| 3,937,588 A | 2/1976 | Kisslan |
| 4,252,498 A | 2/1981 | Radcliffe et al. |
| 4,279,568 A | 7/1981 | Munroe |

(Continued)

FOREIGN PATENT DOCUMENTS

| | | |
|---|---|---|
| EP | 1 988 258 A2 | 11/2008 |
| EP | 2 383 439 A2 | 11/2011 |

(Continued)

OTHER PUBLICATIONS

Nov. 10, 2014 Search Report issued in European Application No. 13192813.

(Continued)

*Primary Examiner* — Igor Kershteyn
(74) *Attorney, Agent, or Firm* — Oliff PLC

(57) ABSTRACT

A method of controlling the angular orientation of at least one variable fluidfoil. The method includes the steps of receiving detected fluidfoil angular orientation data for the at least one fluidfoil; receiving a fluidfoil angular orientation demand; generating a modified angular orientation demand by modifying the fluidfoil angular orientation demand before it is used to control adjustment of the at least one fluidfoil, the modification being performed using the detected fluidfoil angular orientation data; and outputting the modified demand and controlling the at least one fluidfoil angular orientation in accordance with the modified demand.

13 Claims, 9 Drawing Sheets

(56) References Cited

U.S. PATENT DOCUMENTS

Figure 1:
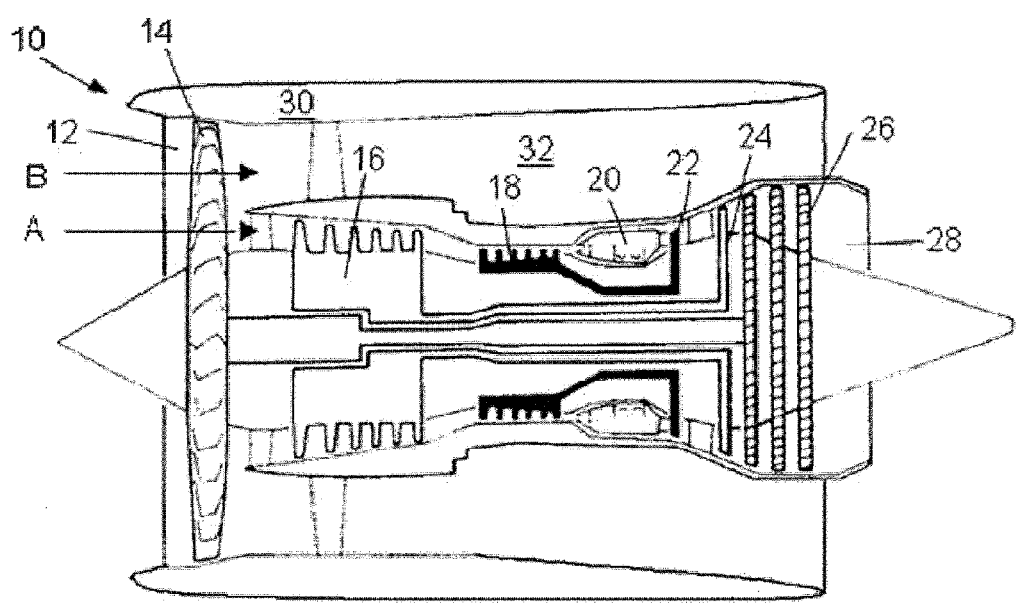

| | | | |
|---|---|---|---|
| 5,042,245 A * | 8/1991 | Zickwolf, Jr. | F04D 27/0246 60/773 |
| 5,044,879 A | 9/1991 | Farrar | |
| 5,133,182 A * | 7/1992 | Marcos | F02C 9/28 60/39.27 |
| 5,357,748 A * | 10/1994 | Khalid | F02C 9/54 60/204 |
| 5,938,401 A | 8/1999 | Modeen et al. | |
| 6,270,037 B1 | 8/2001 | Freese et al. | |
| 6,341,238 B1 | 1/2002 | Modeen et al. | |
| 6,758,044 B2 | 7/2004 | Mannarino | |
| 7,111,461 B2 | 9/2006 | Richey | |
| 7,744,092 B2 | 6/2010 | Mortzheim | |
| 7,970,583 B2 | 6/2011 | Novis et al. | |
| 2006/0257237 A1 | 11/2006 | McDonald et al. | |
| 2007/0084211 A1 | 4/2007 | Bowman et al. | |
| 2009/0029733 A1 | 1/2009 | Schilling et al. | |
| 2009/0297334 A1 | 12/2009 | Norris et al. | |
| 2012/0215417 A1 | 8/2012 | Boyer et al. | |

FOREIGN PATENT DOCUMENTS

| | | |
|---|---|---|
| JP | A-58-214622 | 12/1983 |
| JP | A-2005-291184 | 10/2005 |
| WO | WO 99/58858 A1 | 11/1999 |

OTHER PUBLICATIONS

Mar. 12, 2013 British Search Report issued in British Application No. 1221095.1.

* cited by examiner

MONITORING AND CONTROL SYSTEM

The present invention relates to the monitoring and control of variable fluidfoils and their application in associated systems. More specifically the invention relates to a method of controlling the angular orientation of fluidfoils, variable fluidfoil control units, fluidfoil assemblies, a gas turbine engine, a variable fluidfoil and a method of controlling the dynamic excitation of at least one variable fluidfoil.

For simplicity relevant background to variable fluidfoil monitoring and control is discussed in the context of variable stator vanes for use in gas turbines. As will be appreciated however this is not intended to be limiting, the present invention being applicable to various other variable fluidfoils (e.g. variable pitch rotor blades and unducted fan blades).

Variable stator vanes are used to alter pre and/or post treatment of fluid passing through a rotor with a view to ensuring efficient operation and stability over the full speed range of the rotor. By way of example adjustment of the angle of the vanes of a stator (i.e. closing them) may help to prevent aerodynamic stall at slower rotor speeds.

The angle of a variable stator vane is typically controlled by an actuator control system comprising an actuator control unit and a fluid driven mechanical actuator. Feedback on the angular orientation of vanes is provided by monitoring the drive position of the actuator. Such monitoring can however lead to an inaccurate assessment of variable stator vane angular orientation. By way of specific example, wear and/or damage in the mechanism between the actuator and vane may give rise to errors. Lost motion between drive system and vanes may for example be caused by a worn bearing, failed actuator, frictional loses or bending caused by aerodynamic/mechanical loading. Where it is not possible to accurately compensate for such errors, pessimistic margins must be built in and/or a 'creep' function where an adjustment is made in incremental steps to avoid overshoot. Both of these solutions can reduce overall system performance.

In some applications particularly tight control over variable stator vane angular orientation is necessary, especially for example where the orientations have a significant impact on thrust and/or rotating stall margin.

Aside from the inaccuracies mentioned above that result from prior art systems, there are further broader limitations in terms of monitoring and adjusting the performance of stator vanes and associated systems. These limitations prevent prior art systems from monitoring and accounting for potential damaging conditions such as rotor flutter and stator vane vibration.

According to a first aspect of the invention there is provided a method of controlling the angular orientation of at least one variable fluidfoil, the method comprising the steps of:
  a) optionally receiving detected fluidfoil angular orientation data for the at least one fluidfoil;
  b) optionally receiving a fluidfoil angular orientation demand;
  c) optionally generating a modified angular orientation demand by optionally modifying the fluidfoil angular orientation demand before it is used to control adjustment of the at least one fluidfoil, the modification being optionally performed using the detected fluidfoil angular orientation data; and
  d) optionally outputting the modified demand and optionally controlling the at least one fluidfoil angular orientation in accordance with the modified demand.

The original demand might for example have been issued by a management system (e.g. a Full Authority Digital Engine Control (FADEC) or other engine management system). Such a system might be arranged to instruct alteration of the angular orientation of the one or more fluidfoils according to operational requirements and/or prevailing conditions. The detected fluidfoil angular orientation data may be provided by detectors (e.g. rotary angular detectors associated with at least one of the fluidfoils). The present method may therefore be considered as interpretation of the requirements issued by a management system taking into account additional data available concerning the condition and/or operability of the fluidfoil (e.g. detected fluidfoil angular orientation data).

By intercepting the fluidfoil angular orientation demand, pre-checking and if necessary adjusting it, inaccurate assumptions made in generating the demand may be accounted for in real time before adjustment is made to the angular orientation of the fluidfoil.

In some embodiments the angular orientations of individual fluidfoils may be altered to an angular orientation specifically required by the modified demand. Such angular orientations may be different to those specifically required by the modified demand for others of the fluidfoils. Alternatively groups or all fluidfoils may be adjusted collectively to the same or an average angular orientation.

Although for clarity 'variable fluidfoil' is in general referred to in the singular below, it will be appreciated that the aspects and embodiments may equally relate to multiple variable fluidfoils. In particular the embodiments may relate to a complete stage of variable fluidfoils, one, some or all of which may be provided with one or more detectors for providing fluidfoil angular orientation data. Equally components and features indicated in the paragraphs below to interact with a variable fluidfoil, may equally interact with multiple examples of the same.

In some embodiments the method further comprises receiving further detected fluidfoil angular orientation data and calculating and outputting one or more actuation adjustments. In this way if the further detected fluidfoil angular orientation data indicates that the modified demand has not been implemented correctly and/or has not achieved the desired result, further fluidfoil angular adjustments can be made.

In some embodiments the detected fluidfoil angular orientation data is used when calculating the modified demand to adjust for an assumed fluidfoil angular orientation and/or assumed actuation system performance used in producing the demand. It may be for example that the angular orientation demand was calculated using idealised assumptions with regard to fluidfoil angular orientation and actuation system performance. Using the detected angular orientation data in the calculation of the modified demand may therefore account for inaccurate management system assumptions regarding actual and/or potential variable stator vane angular orientation.

In some embodiments the method further comprises the step of receiving data regarding the operating point of the variable fluidfoil and/or of all or part of a broader system in which the variable fluidfoil is employed. This data may be provided by the management system and could for example be speeds, temperatures and/or pressures. This data may be important in determining the current operating point, which may in turn be used in generation of the modified demand as discussed further below.

In some embodiments the method further comprises the step of selecting a modification algorithm for calculating the modified demand, the selection of the modification algorithm being made according to the operating point of the variable fluidfoil and/or of all or part of a broader system in which the variable fluidfoil is employed. This may be advantageous as different modification algorithms may be tailored to different operating regimes. In the case of a jet engine, these different operating points might for example arise as the result of changes in requested thrust, ambient temperature variation, ambient pressure variation and/or wind direction variation. Different operating points may be associated with different potential issues for the variable fluidfoil and or broader system. Therefore the calculation of the modified demand may serve a dual purpose in modifying the demand to account for potentially inaccurate assumptions made by the management system and by making demand adjustments specific to the operating point.

In some embodiments the operating point of the variable fluidfoil and/or of all or part of the broader system is determined with reference to one or more operability maps for the variable fluidfoil and/or broader system respectively. An operability map may reveal where the fluidfoil and/or broader system is operating within its performance envelope and therefore provide additional information to contribute to selection of an appropriate modification algorithm.

In some embodiments the variable fluidfoil is a variable stator vane and the operability map is for a combination of the variable stator vane and an adjacent rotor. As will be appreciated however the fluidfoil could alternatively be a variable pitch rotor blade, variable fan blade (ducted or unducted), variable compressor rotor blade or variable turbine blade. The rotor could for example be a fan, compressor rotor or turbine rotor.

In some embodiments the operability point is at least in part determined by the angular orientation of the variable stator vane and the speed of the rotor. These may be important features in determining performance of the rotor.

In some embodiments, selection of the modification algorithm is made at least in part in accordance with the proximity of the operability point to at least one of the following rotor operating issues:
 a) rotor flutter;
 b) rotor stall;
 c) aerofoil resonance.

Such conditions may be undesirable and occur at quite different operation points. Therefore a modification algorithm tailored to addressing (e.g. avoiding) a particular condition may be advantageous where particular issues associated with particular operation points arise.

In some embodiments the method further comprises receiving detected dynamic excitation data for the fluidfoil which is used in calculating the modified demand. Therefore the calculation of the modified demand may serve an additional purpose by making demand adjustments specific to the dynamic excitation states encountered.

In some embodiments data on at least one of the following fluidfoil dynamic excitation states is used in calculating the modified demand if present:
 a) normal or environmental vibration;
 b) resonant vibration.

Where such fluidfoil dynamic excitations are encountered, data concerning them used in the calculation of the modified demand may allow an alteration (or 'nudge') to be made to the angular orientation of the fluidfoil in order to avoid a disadvantageous and/or damaging condition. Operation of the fluidfoil and/or an associated broader system closer to its operational limits may therefore be possible.

In some embodiments the method further comprises processing the detected fluidfoil angular orientation data and/or fluidfoil dynamic excitation data to produce statistical data for use in calculation of the modified demand. Statistical data may for example be an average angle for a group of variable stator vanes or data on outliers (e.g. a vane having the greatest or smallest angle). Statistical data may be particularly pertinent in determination of desirable modifications to the demand.

In some embodiments the method further comprises repeating any of the above mentioned method steps at a fixed or varying interval and/or prompted by a specific event. The specific event could for example be receipt of a new demand for variable fluidfoil angular orientation.

As will be appreciated detected fluidfoil angular orientation data and/or operation point data and/or selection of a modification algorithm and/or dynamic excitation data may also be performed/used as appropriate in generating actuation alterations.

According to a second aspect of the invention there is provided a variable fluidfoil control unit optionally arranged in use to control the angular orientation of at least one fluidfoil, the control unit comprising optionally a modification processor, optionally a demand input and optionally a fluidfoil angular orientation input, the modification processor being arranged in use to optionally modify a fluidfoil angular orientation demand received via the demand input, optionally before it is used to control adjustment of the at least one fluidfoil, the modification being optionally performed using detected fluidfoil angular orientation data received via the fluidfoil angular orientation input.

In some embodiments the modification processor is further arranged to select a modification algorithm for calculating the modified demand, the selection of the modification algorithm being made according to the operating point of the variable fluidfoil and/or of all or part of a broader system in which the variable fluidfoil is employed.

According to a third aspect of the invention there is provided a fluidfoil assembly comprising optionally at least one variable fluidfoil, optionally at least one rotary angular detector and optionally a receiver, the rotary angular detector being arranged to optionally detect and optionally output the angular orientation of the fluidfoil optionally to the receiver. Such an assembly may allow for fluidfoil angular orientation to be more accurately determined than alternative systems which take fluidfoil actuator positions as indicative of fluidfoil angular orientation. Specifically the assembly disclosed may be less prone to fluidfoil angular orientation errors that might otherwise arise from hysteresis, slow or incomplete response caused by viscous lubricant, thermal expansion and/or wear and tear (e.g. worn fluidfoil bearing, failing fluidfoil actuator or other worn components).

In some embodiments the rotary angular detector directly senses rotation of a rotating portion of the variable fluidfoil. This may be an efficient system, reducing component count and/or the need for potentially complicated detection equipment. Direct sensing may also increase accuracy in comparison with a sensor that monitors an indirect reference.

In some embodiments the rotary angular detector directly senses rotation of a spindle of the fluidfoil. Sensing of a fluidfoil spindle may provide an accurate indication of fluidfoil angular orientation.

In some embodiments at least part of the rotary angular detector is mounted directly on the spindle of the fluidfoil.

Mounting the detector in this way may improve accuracy without the need to place a detector on an active surface of a fluidfoil.

In some embodiments the rotary angular detector is a Rotary Variable Differential Transformer. This may allow accurate angular orientation detection while also being particularly suitable for monitoring other fluidfoil properties as discussed further below.

In some embodiments the receiver is a fluidfoil control unit arranged to control adjustments to the angular orientation of the fluidfoil. In this way the unit capable of adjusting fluidfoil angular orientation may have the benefit of more accurate data on current fluidfoil angular orientation potentially allowing real-time adjustment.

In some embodiments the fluidfoil control unit has a demand input arranged in use to receive fluidfoil angular orientation demands from a management system. This management system could for example be a Full Authority Digital Engine Control (FADEC) or other engine management system arranged to instruct alteration of the angular orientation of the one or more fluidfoils according to operational requirements and/or prevailing conditions.

In some embodiments the fluidfoil control unit further comprises a modification processor arranged to calculate angular orientation modifications for the fluidfoil. The modification processor may allow several potentially competing factors to be analysed in determining the nature of any desirable adjustment to the present fluidfoil angular orientation.

In some embodiments the modification processor is in use an intermediary between the management system and the variable fluidfoil, using variable fluidfoil angular orientation information from the rotary angular detector to modify demands from the management system. In this way the modification processor may account for management system assumptions regarding current and/or potential variable fluidfoil angular orientation as well as assumptions regarding actuation system performance. The control unit may therefore be considered to interpret the requirements of the management system and implement them in accordance with the actual condition of the fluidfoil.

In some embodiments the fluidfoil control unit further comprises a signal conditioning unit arranged to receive fluidfoil angular orientation data outputted from the rotary angular detector, process the data to produce statistical data and output the statistical data to the modification processor. Statistical data may for example be an average angle for a group of variable fluidfoils or data on outliers (e.g. a fluidfoil having the greatest or smallest angle). Statistical data may be particularly pertinent in the determination by the modification processor of desirable modifications.

In some embodiments the modification processor has an algorithm input arranged to receive one or more modification algorithms from a digital store for use in calculating fluidfoil angular orientation modifications. Different modification algorithms may be appropriate at different operating points of the variable fluidfoil and/or an associated compressor, fan or similar. Therefore the modification algorithm selection may be performed on the basis of the operating point of the variable fluidfoil and/or of all or part of a broader system in which the variable fluidfoil is employed. Different operating points may be associated with different potential issues for the variable fluidfoil and/or broader system. By way of example different operating points may be associated with at least one of the following rotor issues:

a) rotor flutter;
b) rotor stall;
c) aerofoil resonance.

A particular modification algorithm may be arranged to compensate for such regimes (e.g. by making adjustments to variable fluid foil angular position). Therefore by selecting a modification algorithm most relevant to the operating point of the variable fluidfoil and/or broader system, problematic rotor regimes may be addressed.

In some embodiments the fluidfoil control unit is provided with a parameter input arranged in use to receive operability data for the variable fluidfoil and/or all or part of the broader system, from the management system. Data received via the parameter input may allow for a better understanding of the current and/or future operating point, and therefore facilitate modification algorithm selection.

In some embodiments the modification processor has a map input arranged in use to receive one or more operability maps from a digital store, a selected map being used by the modification processor to ascertain the current operating point of the variable fluidfoil and/or of all or part of the broader system. The operability map may reveal where an associated compressor or similar is operating within its performance envelope and therefore allow selection of an appropriate modification algorithm for use by the modification processor. The operability maps may be in the form of lookup tables.

In some embodiments the modification processor has one or more outputs arranged to pass modified angular orientation demands and/or subsequent actuation adjustments from the modification processor to the actuator control unit. This may provide a mechanism for the modification processor to control adjustment of the angular orientation of the variable stator vane.

In some embodiments the actuator control unit operates one or more actuators operatively connected directly or indirectly to one, a group or all variable fluidfoils. As will be appreciated multiple actuators may be used to create redundancy in the event of the failure of an actuator. Further a single actuator may control the angular orientation of a single fluidfoil or may alternatively control multiple fluidfoils (e.g. through the action of a unison ring).

In some embodiments the fluidfoil assembly comprises multiple variable fluidfoils only a proportion of which have an associated rotary angular detector. It may for example be that at least one variable fluidfoil does not have an associated rotary angular detector. Alternatively it may be that up to 50% of the variable fluidfoils have one or more associated rotary angular detectors. Further it may be that between 20 and 30% of the variable fluidfoils in the fluidfoil assembly have one or more associated rotary angular detectors. Reducing the number of detectors may reduce component count, weight and/or cost without significantly affecting the fluidfoil angular orientation data. Specifically it may be that the angular orientation of some fluidfoils can be inferred/extrapolated from the data on other fluidfoils. Similarly it may be possible to infer events such fluidfoil bearing deterioration and fluidfoil dynamic excitation for vanes that are not directly monitored.

In some embodiments the rotary angular detector is further arranged to detect and output a dynamic excitation of the fluidfoil to the receiver. Such dynamic excitations may for example be vibrations or flutter resonance. It may be for example that the rotary angular detectors have a sufficiently high frequency response so as aerofoil vibration can be detected and outputted.

In some embodiments the dynamic excitation is accounted for by the modification processor in calculating a fluidfoil angular orientation modification. This may allow an alteration (or 'nudge') to be made to the angular orientation of one or more fluidfoils in order to avoid a damaging condition (e.g. aerofoil flutter or resonant vibration). Such modifications may also allow a compression system to operate closer to its operational limits (e.g. otherwise overcautious margins may be reduced in view of the more accurate data).

In some embodiments at least one variable fluidfoil is provided with two rotary angular detectors, one at each end. Depending on the dynamic properties of the variable fluidfoil, each detector may be best suited to sensing particular data.

In some embodiments a first detector is positioned at the proximal end of the fluidfoil relative to a rotational drive mechanism for the fluidfoil and is arranged to detect and output angular orientation.

In some embodiments a second detector is positioned at the distal end relative to the rotational drive mechanism for the fluidfoil and is arranged to detect dynamic excitation of the fluidfoil.

The first detector may be considered 'dynamically grounded' due to its proximity to the drive mechanism, whereas the second detector may be considered 'dynamically free', thus facilitating detection of dynamic excitation resulting in torsional oscillations.

In alternative embodiments at least one variable fluidfoil is provided with one rotary angular detector at its distal end relative to a rotational drive mechanism for the fluidfoil, the rotary angular detector being arranged to detect and output both angular orientation and dynamic excitation data. The use of only a single rotary angular detector may reduce cost and complexity, but it may be necessary or desirable to correct for fluidfoil twist due to loading and/or bearing friction when determining the angular orientation.

In some embodiments the variable fluidfoils are variable stator vanes. In particular they may be variable inlet guide vanes. Such vanes may be positioned behind the fan of a gas turbine engine. Alternatively the variable stator vanes may be positioned between rotors or adjacent a rotor of a compressor stage. As will be appreciated the fluidfoils may alternatively be variable pitch rotor blades, variable fan blades (ducted or unducted), variable compressor rotor blades or variable turbine blades.

In some embodiments the fluidfoil assembly is for use as part of a gas turbine. The invention may be particularly suitable for use in a gas turbine engine, especially those used as aircraft power-plants, where tight control of vane position may be very important.

According to a fourth aspect of the invention there is provided a gas turbine engine incorporating a fluidfoil assembly according to the third aspect of the invention.

According to a fifth aspect of the invention there is provided a variable fluidfoil provided with at least one rotary angular detector and suitable for use in a fluidfoil assembly according to the third aspect of the invention.

According to a sixth aspect of the invention there is provided a fluidfoil control unit according to the third aspect of the invention.

According to a seventh aspect of the invention there is provided a fluidfoil assembly comprising optionally at least one variable fluidfoil, optionally at least one detector and optionally a receiver, the detector being optionally arranged to detect and output dynamic excitation data for the fluidfoil to the receiver. This arrangement may allow the receiver to initiate adjustment to the angular orientation of the fluidfoil if it has an undesirable dynamic excitation (e.g. vibration or resonant vibration). Such adjustment may stop the dynamic excitation.

In some embodiments the detector is a rotary angular detector. A rotary angular detector may allow detection of torsional aerofoil vibrations as rotational oscillations. Further a rotary angular detector may allow detection of other dynamic excitation modes which may also cause rotational oscillations.

According to an eighth aspect of the invention there is provided a method of controlling the dynamic excitation of at least one variable fluidfoil, the method comprising the steps of:
a) optionally receiving detected fluidfoil dynamic excitation data for the at least one fluidfoil;
b) optionally calculating and outputting an adjustment of the rotational orientation of the fluidfoil to influence its dynamic excitation.

This method may allow the detection and prevention of undesirable dynamic excitation (e.g. vibration or resonant vibration).

The skilled person will appreciate that a feature described in relation to any one of the above aspects of the invention may be applied mutatis mutandis to any other aspect of the invention.

Figure 2:
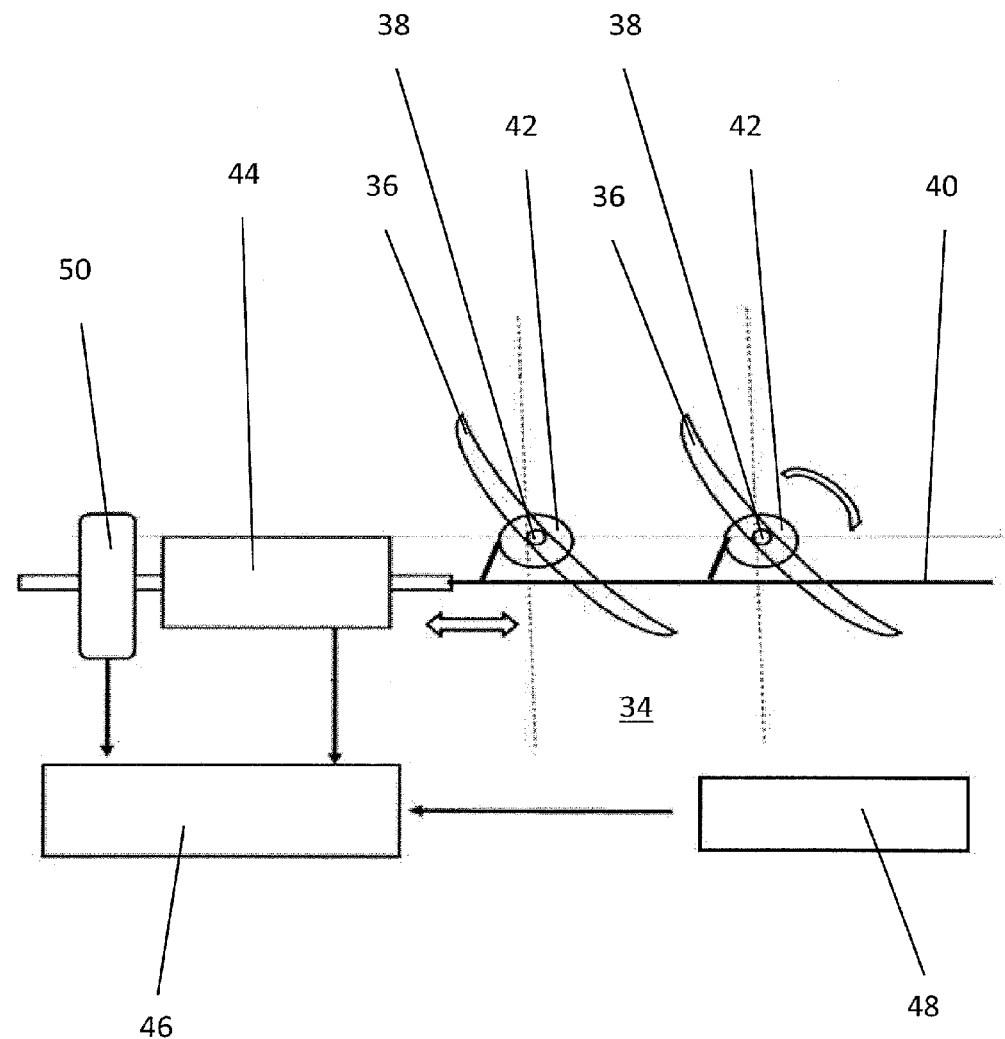
Figure 3A:
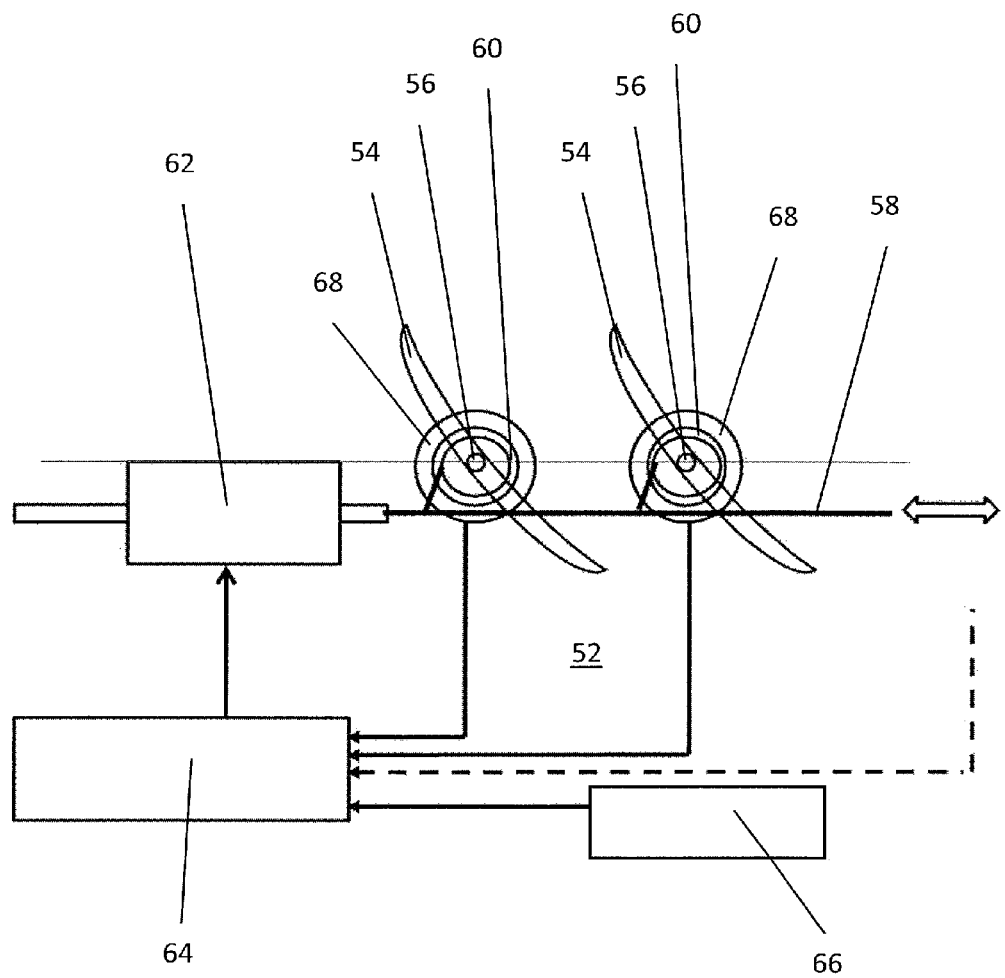
Figure 3B:
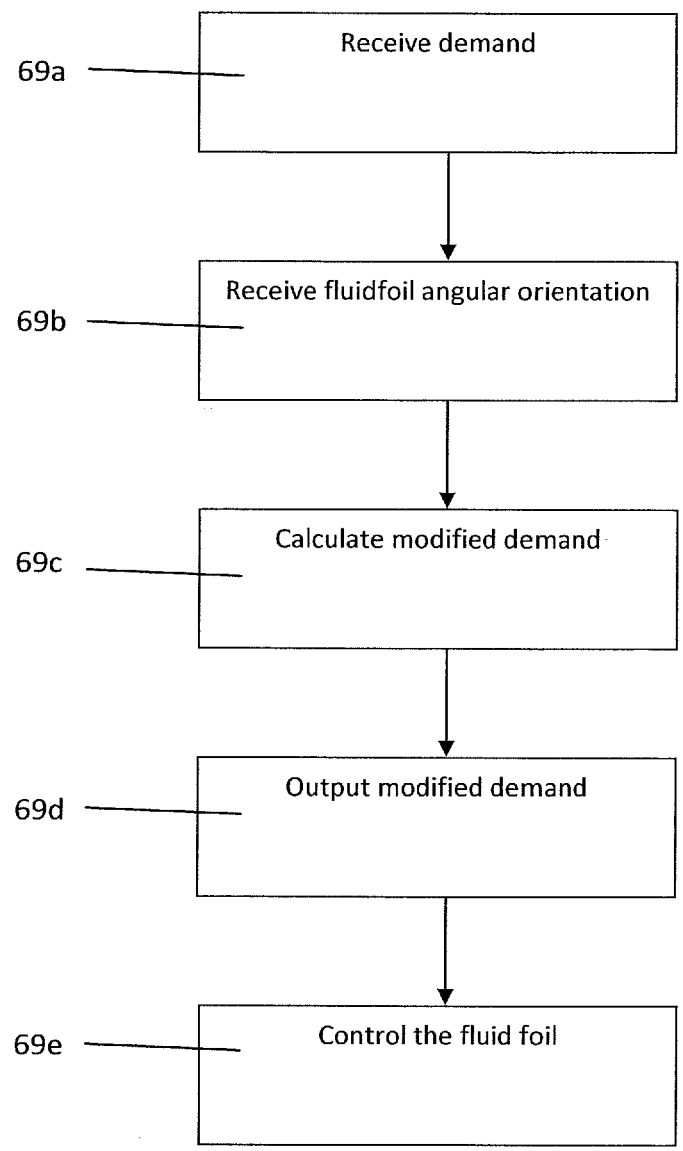
Figure 4:
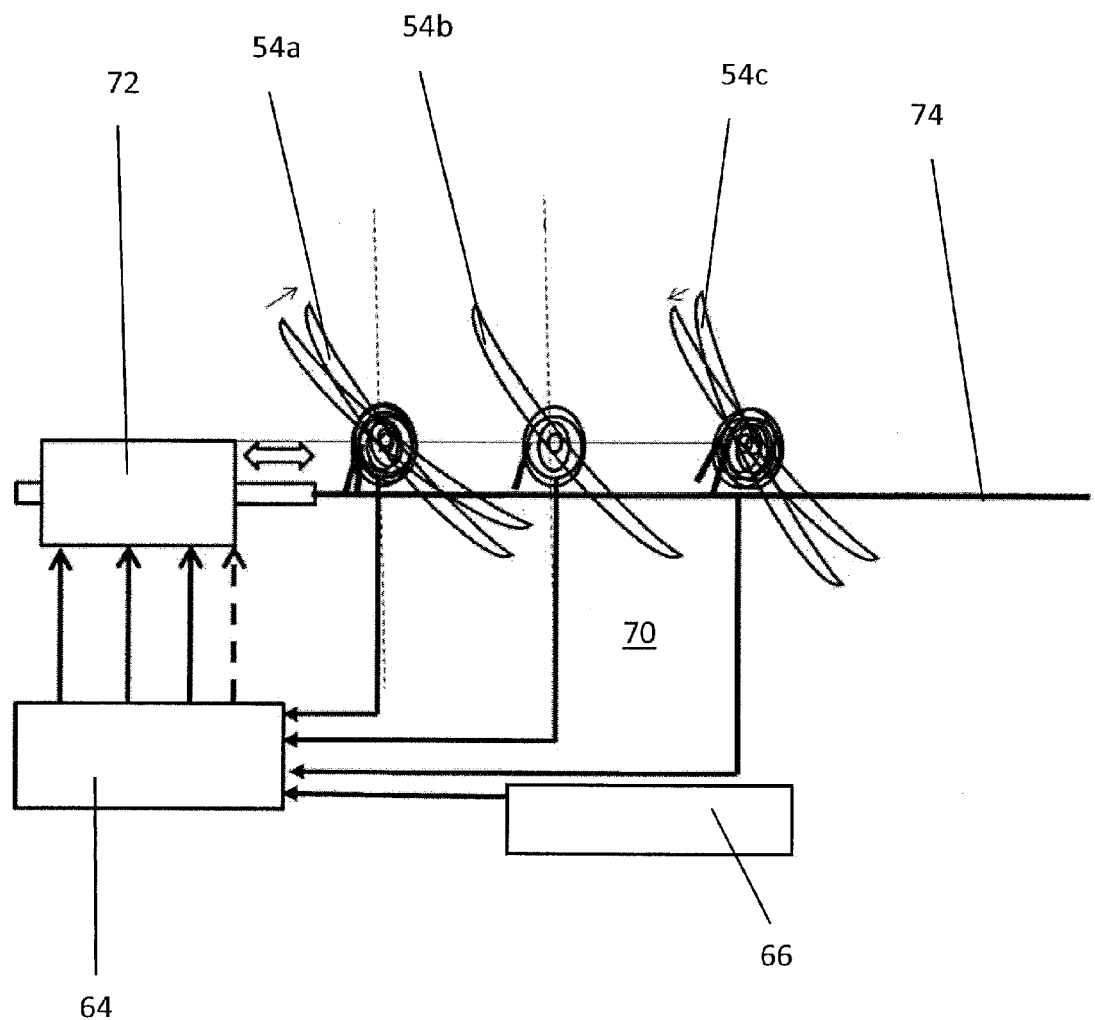
Figure 5:
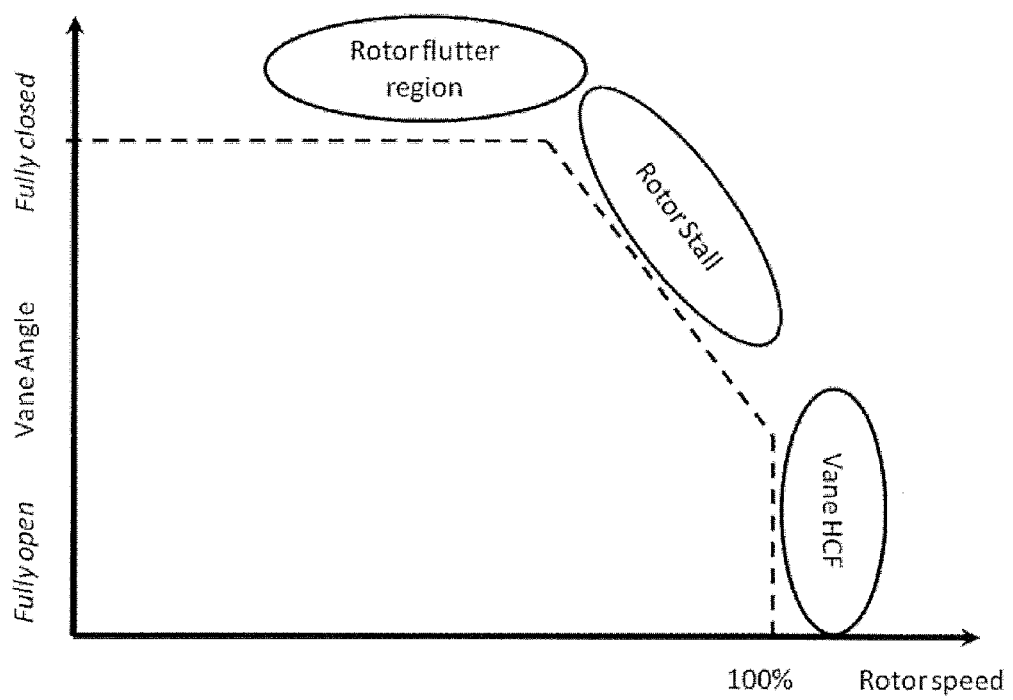
Figure 6:
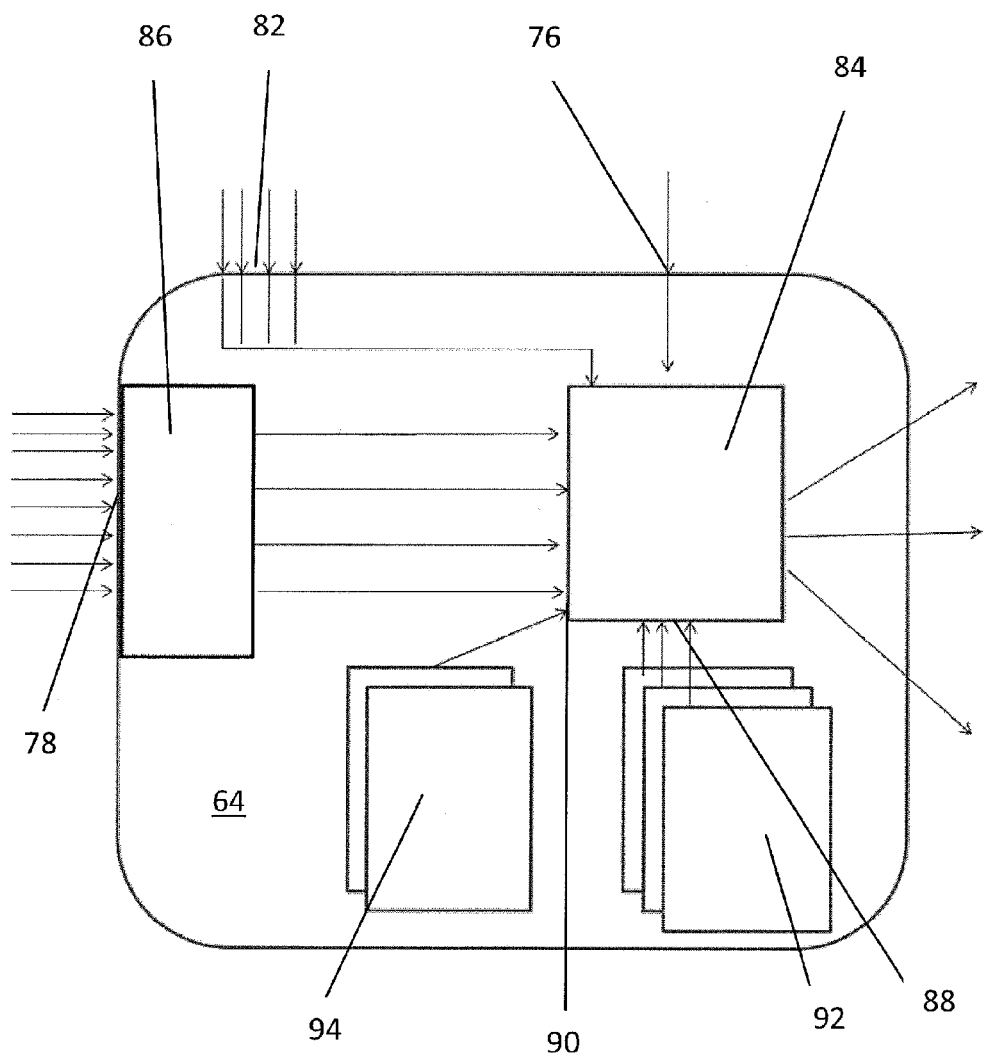
Figure 7:
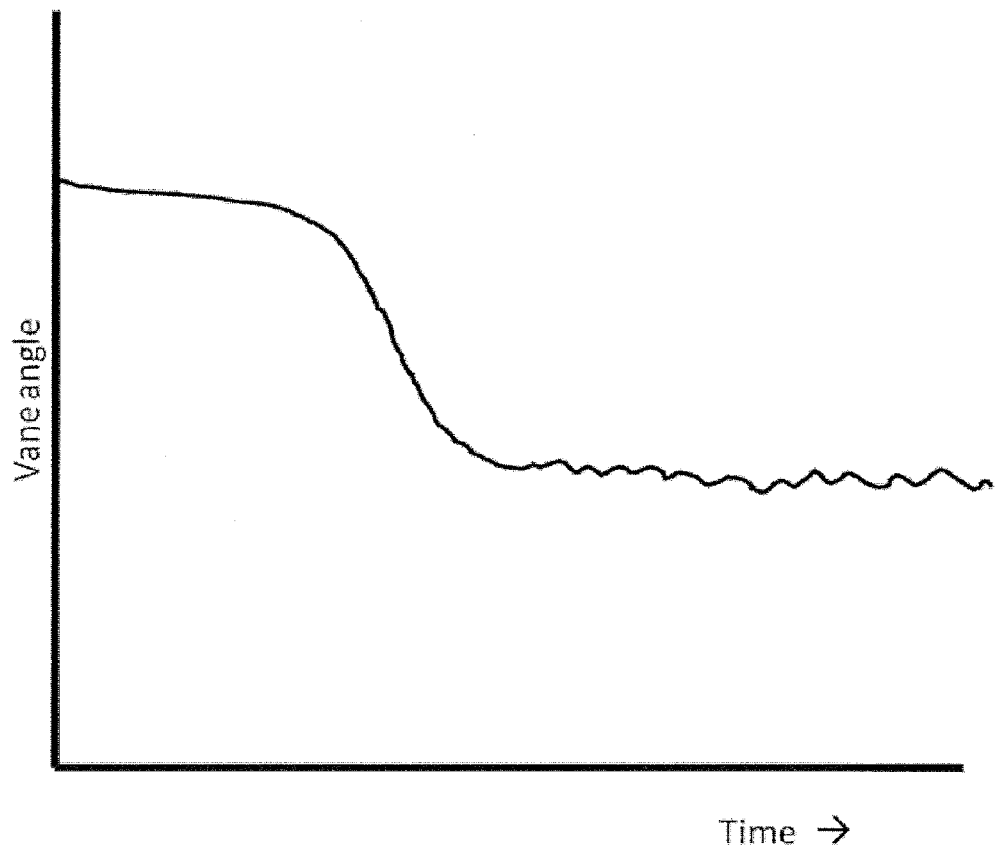
Figure 8:
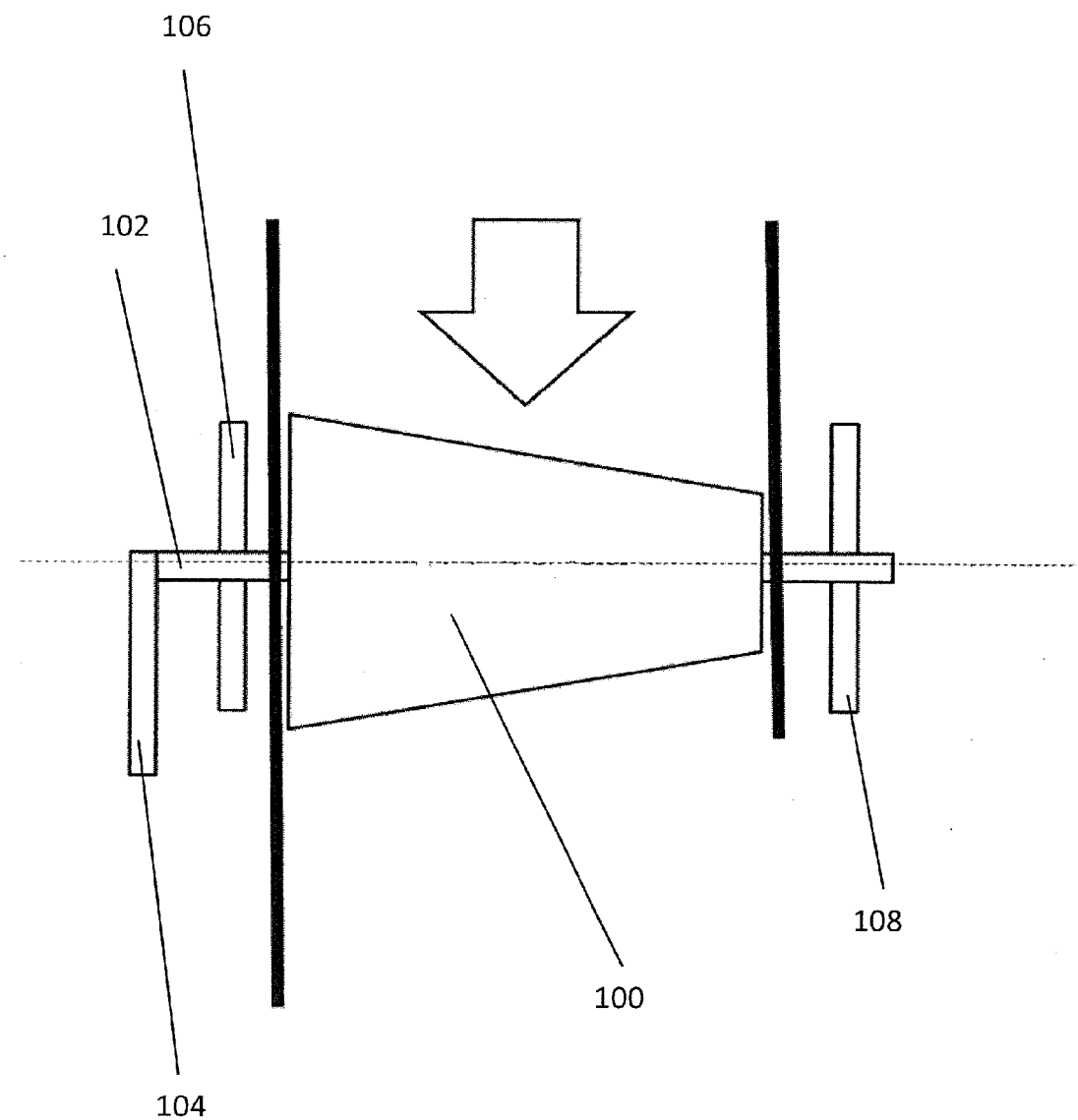

Embodiments of the invention will now be described, by way of example only, with reference to the accompanying Figures in which:

FIG. 1 is a sectional side view of a gas turbine engine;
FIG. 2 is a schematic of a prior art fluidfoil assembly;
FIG. 3A is a schematic of a fluidfoil assembly according to an embodiment of the invention;
FIG. 3B is a flow chart showing the steps of a method for controlling the angular orientation of a fluidfoil according to an embodiment of the invention.
FIG. 4 is a schematic of a fluidfoil assembly according to an embodiment of the invention;
FIG. 5 is an exemplary plot showing a continuum of various operability points for a system comprising a variable stator and compressor, the operability points corresponding to variation in variable stator vane angle and compressor rotor speed;
FIG. 6 is a schematic of a variable fluidfoil control unit according to an embodiment of the invention;
FIG. 7 is a plot of variable stator vane angular orientation v time;
FIG. 8 is a schematic of a variable fluidfoil according to an embodiments of the invention.

A gas turbine engine 10 is shown in FIG. 1 and comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. A nacelle 30 surrounds the gas turbine engine 10 and defines, in axial flow B, a bypass duct 32.

Referring now to FIG. 2 a prior art fluidfoil assembly is generally provided at 34. The fluidfoil assembly 34 has two fluidfoils (in this case stator vanes 36) each of which has an axially extending spindle 38. The stator vanes 36 are variable in that their angular orientations are adjustable by rotation of the stator vane 36 about the axis created by its corresponding spindle 38.

Each spindle 38 is operatively connected to an actuator (in this case an actuator ram 40) via a respective bearing 42. The actuator ram 40 is linearly displaceable by an actuator control unit 44 which is controlled by a fluidfoil control unit 46. The fluidfoil control unit 46 receives stator vane 36 angular orientation demands from a management system 48. Additionally the fluidfoil control unit 46 receives data on the linear position of the actuator ram 40 from a linear position detector 50.

In use the stator vanes 36 might for example be positioned upstream of the intermediate pressure compressor 16. Depending on performance requirements and/or ambient conditions the management system 48 might demand an angular orientation change to the stator vanes 36. The demand might for example be to 'close' the vanes by a number of degrees, to limit airflow to the intermediate pressure compressor 16. In response the fluidfoil control unit 46 would control the actuator control unit 44 to adjust the linear position of the ram 40 in accordance with the demand. Movement of the ram 40 would, via bearings 42, cause rotation of the spindles 38 and so rotation of each stator vane 36 as a whole. The linear position detector 50 would provide feedback to the fluidfoil control unit 46, facilitating a check that the linear adjustment to the position of the ram 40 corresponds to that demanded by the fluidfoil control unit 46. This is assumed to provide a check on the desired position of the stator vanes 36. If the position of the ram 40 does not correspond to the demanded position, one or more further demands for linear adjustment of the ram 40 are sent to the actuator control unit 44 by the fluidfoil control unit 46.

Depending on the exact nature of the system this repetitive post-correction process may be used to 'creep' towards the desired configuration. The management system may therefore make progressive demands with a view to preventing overshoot of the desired configuration. In alternative systems the demand from the management system is a deliberate exaggeration of what is actually desired. In this way the demand has a built in compensation for assumed loss of motion due to wear.

Referring now to FIG. 3A a fluidfoil assembly is generally provided at 52. As will be appreciated however this is not intended to be limiting and the skilled man will appreciate that there are many alternative applications. The fluidfoil assembly 52 has two fluidfoils (in this case stator vanes 54) each of which has an axially extending spindle 56. The stator vanes 54 are variable in that their angular orientations are adjustable by rotation of the stator vane 54 about the axis created by its corresponding spindle 56.

Each spindle 56 is operatively connected to an actuator ram 58 via a respective bearing 60. The actuator ram 58 is linearly displaceable by an actuator control unit 62 which is controlled by a fluidfoil control unit 64. The fluidfoil control unit 64 receives stator vane 54 angular orientation demands from a management system 66. Additionally the fluidfoil control unit 64 receives data on the angular orientation of each stator vane 54 from a respective rotary angular detector (in this case a Rotary Variable Differential Transformer 68 (RVDT)). The fluidfoil control unit 64 may therefore be considered to be a receiver.

Each RVDT 68 is mounted directly on the respective spindle 56 of the stator vane 54 it is monitoring, therefore directly monitoring the angular orientation of the spindle 56 and so the stator vane 54.

In use the stator vanes 54 might for example be positioned upstream of the intermediate pressure compressor 16. Depending on performance requirements and/or ambient conditions the management system 66 might demand an angular orientation change to the stator vanes 54 (see step 69a of FIG. 3B). The demand might for example be to 'close' the vanes 54 by a number of degrees to limit airflow to the intermediate pressure compressor 16. In response the fluidfoil control unit 64 uses the data it has received in relation to the current position of the stator vanes 54 (see step 69b) to modify the demand (see step 69c). In this way the fluidfoil control unit 64 interprets the demand from the management system 66 and modifies it in order to best achieve the desired effect given the reality of the stator vane 54 angular orientations and actuator system performance. The accurate angular orientation data provided by the RVDTs 68 allows this modification of the demand to achieve better results. The modified demand is outputted to the actuator control unit in step 69d).

The modification of the demand may account for factors such as scatter in the angular orientation of the vanes from the desired angular orientation e.g. by modifying the demand so as actuation results in the average vane 54 angular orientation corresponding to the original demand. It may also account for systematic problems, e.g. where RVDTs 68 consistently show that the angular orientation adjustment achieved would differ from the demand due to loss in the adjustment mechanisms, the fluidfoil control unit 64 may pre-empt this and modify the demand to compensate. As will be appreciated, if at any point the scatter, systemic problems, angular orientation outliers or any other performance characteristic recorded by the RDVTs 68 falls outside of tolerance, an alarm signal may be sent to an engine health monitoring system or similar. Such an alarm signal might for example indicate the need for maintenance.

Using the modified demand the fluidfoil control unit 64 would control the actuator control unit 62 to adjust the linear position of the ram 58 (see step 69e). Movement of the ram 58 would, via bearings 60, cause rotation of the spindles 56 and so the whole stator vanes 54. The RVDTs 68 would provide feedback to the fluidfoil control unit 64, so as to check that the position of each stator vane 54 corresponds to that demanded by the fluidfoil control unit 64. If the angular orientation of one or more stator vanes 54 does not correspond to that demanded, one or more actuation adjustment demands may be sent to the actuator control unit 62 by the fluidfoil control unit 64. As will be appreciated the direct monitoring of the rotational orientation of the stator vanes 54 by the RDVTs 68 may allow for more accurate adjustment in comparison with the prior art. In particular it allows for the monitoring of individual and/or groups of vanes 54, therefore potentially allowing a correction based on average vane 54 angular orientation, or even based on particular vanes 54 with comparatively large angular orientation errors.

Referring now to FIG. 4, a fluidfoil assembly is generally provided at 70. The fluidfoil assembly is substantially similar to the fluidfoil assembly of FIG. 3A, and like features are given the same reference numeral. The only difference is that the fluidfoil assembly 70 has an actuator control unit 72 that drives a separate ram (only one shown) 74 for adjusting the angular orientation of each stator vane 54a, 54b and 54c. This arrangement allows the fluidfoil control unit 64 to modify the demand and perform actuation adjustments in respect of individual stator vanes 54a, 54b and 54c.

FIG. 5 is a hypothetical plot of variation in variable stator vane angle against the rotor speed of an associated compressor (fluid being fed to the compressor rotor via the stator vanes). FIG. 5 introduces the concept and significance of operability points.

As will be appreciated a compressor may be considered to have multiple possible operation points. A simple example would be different operation points corresponding to different compressor rotor speeds. An operability map may place the various operation points in context, showing where a particular operation point sits within operability potential and tolerance. As will be appreciated operability points may refer to individual components (e.g. the rotor of the compressor) or to broader systems (e.g. the whole compressor stage, a combination of the rotor and a stator in which the stator vanes sit, or a whole engine in which the compressor and stator operate). In any case different operation points may give rise to different operability features and/or issues.

In the specific case of FIG. 5, operability points of the combination of the stator and compressor rotor are considered. Specifically the operability envelope encompassing stator vane angles from fully closed through fully open and compressor rotor speeds from 0% to 100% is shown. As can be seen different operability points introduce different potential hazards for the system. Specifically where the stator vanes are fully closed the compressor rotor may be at risk of flutter. In the region where the stator vanes are in an intermediate position (tailored to the higher rotor speeds), there may be a risk that incorrect stator vane angular orientation might lead to rotor stall. Finally prolonged use of high rotor speeds and stator vanes proximate their fully open configuration may increase the rate of vane high cycle fatigue. Embodiments of the present invention allow account to be taken of different operation points when modifying the demand from the management system and in demanding further actuation alterations.

Referring now to FIG. 6 the fluidfoil control unit 64 of FIGS. 3 and 4 is shown in more detail. The fluidfoil control unit 64 has a demand input 76 arranged to receive fluidfoil angular orientation demands from the management system 66. The fluidfoil control unit 64 also has a fluidfoil angular orientation input 78 which receives fluidfoil angular orientation data from the RVDTs 68 associated with the fluidfoils 54. A parameter input 82 is also provided to receive operability data from the management system 66 (e.g. compressor rotor speed).

The fluidfoil control unit 64 has a modification processor 84 arranged to generate and output modified fluidfoil angular orientation demands and actuation adjustments to the actuator control unit 62 or 72. The modification processor 84 receives statistical data on the fluidfoil angular orientation data via a signal conditioning unit 86. The signal conditioning unit 86 receives the fluidfoil angular orientation data from the fluidfoil angular orientation input 78. The modification processor also receives operability data from the parameter input 82 and fluidfoil angular orientation demands from the demand input 76.

The modification processor 84 is further provided with an algorithm input 88 and a map input 90. The algorithm input 88 is arranged to receive modification algorithms selected by the modification processor 84 from a digital store 92. The map input 90 is arranged to receive operability maps 94 (in the form of lookup tables) for use by the modification processor 84 in interpreting the operability data from the parameter input 82.

As will be appreciated the modification processor 84 has access to fluidfoil angular orientation demands and fluidfoil angular orientation data, therefore allowing it to perform its role in producing modified demands and actuation alterations as discussed in relation to FIGS. 3 and 4. The operability data, operability maps and modification algorithms additionally accessible to the modification processor 84 also allow for provision to be made for different operability points as discussed in relation to FIG. 5. Specifically the operability data and operability maps enable the modification processor 84 to establish the current operating point of (in this case) the combination of the stator vanes 54 and the compressor rotor, allowing the modification processor 84 to select the most appropriate modification algorithm. By selecting a modification algorithm tailored to a range of operating points and issues that arise within that range, the modification processor 84 can address issues specific to the relevant operating point (e.g. rotor flutter, rotor stall or vane high cycle fatigue). In addressing such issues the modification processor 84 may for example over-ride demands from the management system which would create a potentially undesirable state, thereby modifying the demand to instead require a comparable but less damaging fluidfoil angular orientation. The modification processor 84 may also address such issues in making actuation alterations (e.g. when implementation of a modified demand has given rise to such an issue).

As will be appreciated different modification algorithms tailored to different operability regimes may place different emphasis on different events. By way of example, in one operating regime a stator vane that is an outlier in terms of its angular orientation may be particularly undesirable and so actuation alteration may be performed to compensate (e.g. by adjusting the angular orientation of all stator vanes). In other operating regimes the outlier may be of very little consequence, and might therefore be ignored by a suitably tailored modification algorithm.

In addition to selecting a modification algorithm in accordance with a specific operating point, the modification processor 84 may also account for dynamic excitations detected in one or more of the stator vanes 54. Where dynamic excitations (e.g. random or harmonic vibration) are detected in a stator vane 54 the modification processor may alter the stator vane 54 angular orientation when generating a modified demand and/or actuation alteration, thus 'nudging' the stator vane away from the condition.

Referring now to FIG. 7 a plot of stator vane angular orientation against time is shown. As can be seen, as time passes the vane angular orientation is decreased. At the minimum vane angular orientation shown there is evidence of the vane exhibiting dynamic excitation, with the RVDT 68 recording a rapid oscillation of the angular orientation. Assuming the RVDT 68 operates at a sufficient frequency it may be capable of detecting torsional modes of dynamic excitation, being arranged as it is to detect shifts in angular orientation. It may also however be possible to detect bending modes of dynamic excitation which may alter the torsional oscillations.

Where dynamic excitations are to be accounted for in generating modified demands and actuation alterations, special consideration to the rotary angular detector arrangement may be advantageous. In FIG. 8 a variable stator vane 100 is shown in association with its spindle 102. The spindle 102 is operatively attached to a rotational drive mechanism 104.

A first rotary angular detector (in this case an RVDT 106) is positioned at the proximal end of the stator vane 100 relative to the rotational drive mechanism 104. The first RVDT 106 is arranged to detect and output angular orientation data for the stator vane 100. The position of the first RVDT 106 proximal to the rotational drive mechanism 104 may mean that it is dynamically grounded and therefore relatively stable, assisting accurate detection of angular orientation.

A second rotary angular detector (in this case an RVDT 108) is positioned at the distal end of the stator vane 100 relative to the rotational drive mechanism 104. The second RVDT 108 is arranged to detect and output dynamic excitation of the stator vane 100. The position of the second RVDT 108 distal to the rotational drive mechanism 104 may mean that it is dynamically free and therefore is better able to detect dynamic excitation in the stator vane 100.

Despite the above it will be appreciated that a single rotary angular detector could detect and output angular orientation and dynamic oscillation data.

It will be understood that the invention is not limited to the embodiments above-described and various modifications and improvements can be made without departing from the various concepts described herein. Any of the features may be employed separately or in combination with any other features and the invention extends to and includes all combinations and sub-combinations of one or more features described herein in any form of fluidfoil control unit or fluidfoil assembly. By way of example, although the examples above are generally made in the context of a gas turbine engine and specifically variable stator vanes, it will be appreciated that the invention is also applicable to alternative systems (e.g. variable pitch rotor blade, variable fan blade (ducted or unducted), variable compressor rotor blade and variable turbine blade). Further although the fluidfoil control unit is described as receiving demands and data from the management system it will be understood that the fluidfoil control unit could be a fully integrated part of the management system. Further the actuator control unit might be fully integrated with the fluidfoil control unit and/or management system.

The invention claimed is:

1. A method of controlling the angular orientation of at least one variable fluidfoil, the method comprising the steps of:
   a) receiving detected fluidfoil angular orientation data for the at least one fluidfoil;
   b) receiving data regarding the operating point of the variable fluidfoil and/or of all or part of a broader system in which the variable fluidfoil is employed;
   c) receiving a fluidfoil angular orientation demand;
   d) selecting a modification algorithm for calculating a modified angular orientation demand, the selection of the modification algorithm being made according to the operating point of the variable fluidfoil and/or of all or part of a broader system in which the variable fluidfoil is employed;
   e) generating the modified demand by modifying the fluidfoil angular orientation demand before it is used to control adjustment of the at least one fluidfoil, the modification being performed using the detected fluidfoil angular orientation data; and
   f) outputting the modified demand and controlling the at least one fluidfoil angular orientation in accordance with the modified demand.

2. A method according to claim 1 where the detected fluidfoil angular orientation data is used when calculating the modified demand to adjust for an assumed fluidfoil angular orientation and/or assumed actuation system performance used in producing the demand.

3. A method according to claim 1 where the operating point of the variable fluidfoil and/or of all or part of the broader system is determined with reference to one or more operability maps for the variable fluidfoil and/or broader system respectively.

4. A method according to claim 3 further comprising receiving detected dynamic excitation data for the fluidfoil which is used in calculating the modified demand.

5. A variable fluidfoil control unit arranged in use to control the angular orientation of at least one fluidfoil, the control unit comprising
   a modification processor,
   a demand input and
   a fluidfoil angular orientation input,
      the modification processor being arranged in use to modify a fluidfoil angular orientation demand received via the demand input, before it is used to control adjustment of the at least one fluidfoil, the modification being performed using detected fluidfoil angular orientation data received via the fluidfoil angular orientation input; and
      the modification processor being further arranged to select a modification algorithm for calculating the modified demand, the selection of the modification algorithm being made according to the operating point of the variable fluidfoil and/or of all or part of a broader system in which the variable fluidfoil is employed.

6. A fluidfoil assembly comprising
   at least one variable fluidfoil,
   at least one rotary angular detector, and
   a receiver, wherein:
      the rotary angular detector is arranged to detect and output the angular orientation of the fluidfoil to the receiver,
      the receiver is a fluidfoil control unit arranged to control adjustments to the angular orientation of the fluidfoil,
      the fluidfoil control unit has a demand input arranged in use to receive fluidfoil angular orientation demands from a management system,
      the fluidfoil control unit further comprises a modification processor arranged to calculate angular orientation modifications for the fluidfoil, and
      the modification processor is in use an intermediary between the management system and the variable fluidfoil, using variable fluidfoil angular orientation information from the rotary angular detector to modify demands from the management system.

7. A fluidfoil assembly according to claim 6 where the modification processor has an algorithm input arranged to receive one or more modification algorithms from a digital store for use in calculating fluidfoil angular orientation modifications.

8. A fluidfoil assembly according to claim 7 where the fluidfoil control unit is provided with a parameter input arranged in use to receive operability data for the variable fluidfoil and/or all or part of the broader system, from the management system.

9. A fluidfoil assembly according to claim 7 where the modification processor has a map input arranged in use to receive one or more operability maps from a digital store, a selected map being used by the modification processor to ascertain the current operating point of the variable fluidfoil and/or of all or part of the broader system.

10. A fluidfoil assembly according to claim 6 where the rotary angular detector is further arranged to detect and output a dynamic excitation of the fluidfoil to the receiver.

11. A fluidfoil according claim 6 where at least one variable fluidfoil is provided with two rotary angular detectors, one at each end.

12. A fluidfoil according to claim 11 where a first detector is positioned at the proximal end of the fluidfoil relative to a rotational drive mechanism for the fluidfoil and is arranged to detect and output angular orientation.

13. A fluidfoil assembly according to claim 12 where a second detector is positioned at the distal end relative to the rotational drive mechanism for the fluidfoil and is arranged to detect dynamic excitation of the fluidfoil.

\* \* \* \* \*